United States Patent [19]

Hinnenkamp et al.

[11] 4,423,020
[45] * Dec. 27, 1983

[54] CRYSTALLINE METAL SILICATE COMPOSITIONS

[75] Inventors: James A. Hinnenkamp; Vernon V. Walatka, Jr., both of Hamilton, Ohio

[73] Assignee: National Distillers and Chemical Corporation, New York, N.Y.

[*] Notice: The portion of the term of this patent subsequent to May 25, 1999, has been disclaimed.

[21] Appl. No.: 311,724

[22] Filed: Oct. 15, 1981

Related U.S. Application Data

[63] Continuation of Ser. No. 92,127, Nov. 7, 1979, Pat. No. 4,331,641.

[51] Int. Cl.$^3$ .................. C01B 33/20; C01B 35/10
[52] U.S. Cl. ................................ 423/277; 423/326
[58] Field of Search ............... 423/277, 326–333; 260/429 R, 448.2 N, 448 C; 252/432, 454, 455 Z; 556/402

[56] References Cited

U.S. PATENT DOCUMENTS

| | | | |
|---|---|---|---|
| 3,941,871 | 3/1976 | Dwyer et al. | 423/332 |
| 4,088,605 | 5/1978 | Rollmann | 423/328 X |
| 4,269,813 | 5/1981 | Klotz | 423/277 |
| 4,285,919 | 8/1981 | Klotz et al. | 423/277 |
| 4,299,808 | 11/1981 | Klotz | 423/331 |
| 4,331,641 | 5/1982 | Hinnenkamp et al. | 423/277 |

*Primary Examiner*—Edward J. Meros
*Attorney, Agent, or Firm*—Kenneth D. Tremain

[57] ABSTRACT

Crystalline metal silicate compositions are prepared from a silica containing mixture which is substantially free of aluminum ions and which contains a chelating agent by digesting a reaction mixture comprising, a tetraalkylammonium compound, sodium hydroxide, a metal compound, an oxide of silicon, a chelating agent and water, with the reaction mixture containing less than about 100 ppm aluminum. Crystalline borosilicate compositions are of special interest. A method for activating the new crystalline compositions to enhance their usefulness for certain conversion processes is also disclosed.

6 Claims, 4 Drawing Figures

FIG. 1
NITROGEN ISOTHERMS

FIG. 4
NITROGEN ISOTHERMS

CRYSTALLINE METAL SILICATE COMPOSITIONS

This is a continuation of application Ser. No. 092,127, filed Nov. 7, 1979, now Pat. No. 4,331,641.

BACKGROUND OF THE INVENTION

The present invention relates to new crystalline borosilicate compositions. Further, this invention relates to methods for producing these new crystalline borosilicate compositions and to a method for activating them to enhance their usefulness for certain catalytic conversion processes.

Zeolitic materials, both natural and synthetic, are known to have catalytic capability for various types of reactions, especially hydrocarbon conversions. The well-known crystalline aluminosilicate zeolites are commonly referred to as "molecular sieves" and are characterized by their highly ordered crystalline structure and uniformly dimensioned pores, and are distinguishable from each other on the basis of composition, crystal structure, adsorption properties and the like. The term "molecular sieves" is derived from the ability of the zeolite materials to selectively adsorb molecules on the basis of their size and form.

The processes for producing such crystalline synthetic zeolites are well known in the art. A family of crystalline aluminosilicate zeolites, designated ZSM-5, is disclosed in U.S. Pat. No. 3,702,886, said patent being herein incorporated by reference.

U.S. Pat. No. 3,941,871 relates to novel crystalline metal organosilicates which are essentially free of Group IIIA metals, i.e., aluminum and/or gallium. This patent is herein incorporated by by reference. It is noted therein that the amount of alumina present in the known zeolites appears directly related to the acidity characteristics of the resultant product and that a low alumina content has been recognized as being advantageous in attaining a low degree of acidity which in many catalytic reactions is translated into low coke making properties and low aging rates. A typical procedure for making the organosilicates is to react a mixture containing a tetraalkylammonium compound, sodium hydroxide, an oxide of a metal other than a metal of Group IIIA, an oxide of silicon, and water until crystals of said metal organosilicates are formed. It is also noted in the patent that the family of crystalline metal organosilicates have a definite X-ray diffraction pattern which is similar to that for the ZSM-5 zeolites. Minor amounts of alumina are contemplated in the patent and are attributable primarily to the presence of aluminum impurities in the reactants and/or equipment employed.

U.S. Pat. No. 3,884,835 discloses crystalline silica compositions. The crystalline silica materials may also contain a metal promoter which may be selected from Group IIIA, Group V B or Group VI B elements. Boron is disclosed as one of the metal promoters.

U.S. Pat. No. 4,088,605 is directed to the synthesis of a zeolite, such as ZSM-5, which contains an outer shell free from aluminum. The patent states at column 10, the paragraph beginning at line 20, that to produce the outer aluminum-free shell it is also essential that the reactive aluminum be removed from the reaction mixture. It is therefore necessary, as noted therein, to process the zeolite and to replace the crystalization medium with an aluminum-free mixture to obtain crystalization of $SiO_2$ on the surface of the zeolite which can be accomplished by a total replacement of the reaction mixture or by complexing from the original reaction mixture any remaining aluminum ion with reagents such as gluconic acid or ethylene diamine tetraacetic acid (EDTA).

Crystalline borosilicate compositions are disclosed in U.S. patent application Ser. Nos. 733,267 and 836,403. These applications relate specifically to borosilicates and are prepared using the usual procedures for making the aluminosilicates zeolites. It is noted therein on page 12 of No. 836,403 that in instances where a deliberate effort is made to eliminate aluminum from the borosilicate crystal structure because of its adverse influence on particular conversion processes, the molar ratios of $SiO_2/Al_2O_3$ can easily exceed 2000–3000 and that this ratio is generally only limited by the availability of aluminum-free raw materials.

While the art has provided zeolitic catalysts having a wide variety of catalytic and adsorbtive properties, the need still exists for crystalline materials having different and/or enhanced catalytic properties. For example, an important use for a crystalline material is in conversion processes of oxygenated compounds such as the conversion of dimethyl ether to aliphatic compounds with a minimum amount of aromatics being formed. Additionally, many hydrocarbon conversion processes are performed employing zeolites, i.e., alkylation and isomerization. As is well-known in the art, it is important to maximize selectively to the desired product and, as will be shown hereinbelow, the reaction of oxygenated compounds, e.g., dimethyl ether, and hydrocarbons, using compositions prepared by the method of the invention unexpectedly produce high selectivity to aliphatics and high activity which is contrary to that expected from a crystalline zeolite type composition containing a low level of alumina.

SUMMARY OF THE INVENTION

A new class of crystalline borosilicate compositions has been discovered. These crystalline compositions may be prepared by a special process which requires that the amount of aluminum be carefully controlled in the reaction mixture and that a chelating agent be employed in the reaction mixture. It is noted that when the aluminum content of the reaction mixture is below about 100 ppm that the aluminum content of the catalyst is about the same with or without the use of the chelating agent. Of special interest is a borosilicate composition identified as USI-10B but other specially prepared silica compositions are included herein: e.g., crystalline silica compositions containing silica with or without a metal oxide, other than aluminum oxide, e.g., selected from Group IIIA, Group VB and Group VI B may be specially prepared using the method of this invention. While boron is not a metal per se, its oxide is considered a metal oxide as defined herein.

In accordance with the present invention, there is provided crystalline metal silicates which are substantially free of aluminum, less than about 100 wppm (weight parts per million), and which can be identified in terms of mole ratios of oxides, as follows: $0.8 \pm 0.4$ $M_{2/n}O : W_2O_3 : 5$ to $500$ $SiO_2 : O$ to $100$ or more $H_2O$ where M is a cation, n is the valence of said cation, and $W_2O_3$ a metal oxide. In a preferred form, W is boron and M is selected from the group consisting of alkali metal cations, especially sodium, tetraalkylammonium and phosphonium cations, the alkyl groups of which preferably contain 1-6, more preferably, 2-5 carbon atoms, and mixtures thereof.

Members of the family of crystalline borosilicate compositions USI-10B possess a definite crystalline structure whose x-ray diffraction pattern shows the following significant lines, the material being in the dried form:

TABLE 1

| Interplanar Spacing d(A) | Relative Intensity |
|---|---|
| 11.0 | M |
| 9.93 | W |
| 9.60 | VW |
| 8.89 | VW |
| 7.37 | VW |
| 7.02 | VW |
| 6.65 | VW |
| 6.20 | VW |
| 6.00 | VW |
| 5.94 | VW |
| 5.68 | VW |
| 5.53 | VW |
| 5.34 | VW |
| 5.09 | VW |
| 4.98 | VW |
| 4.57 | VW |
| 4.41 | VW |
| 4.33 | VW |
| 4.23 | VW |
| 4.06 | VW |
| 3.98 | VW |
| 3.81 | VS |
| 3.74 | M |
| 3.69 | MS |
| 3.45 | VW |
| 3.41 | VW |
| 3.31 | VW |
| 3.29 | VW |
| 3.23 | VW |
| 3.15 | VW |
| 3.12 | VW |
| 3.04 | W |
| 2.97 | W |
| 2.93 | VW |
| 2.85 | VW |
| 2.77 | VW |
| 2.71 | VW |
| 2.59 | VW |
| 2.57 | VW |
| 2.49 | VW |
| 2.47 | VW |
| 2.40 | VW |
| 2.38 | VW |
| 2.11 | VW |
| 2.07 | VW |
| 2.00 | VW |
| 1.98 | W |
| 1.94 | W |
| 1.90 | VW |
| 1.86 | VW |
| 1.82 | VW |
| 1.75 | VW |
| 1.71 | VW |
| 1.65 | VW |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities 100 I/$I_o$ where $I_o$ is the intensity of the strongest line or peak, and d(obs.), the interplanar spacing in A. corresponding to the recorded lines, were calculated. In Table I the relative intensities are given in terms of the symbols VW=very weak (less than 10), W=weak (10-19), M=medium, (20-39), MS=medium strong (40-70) and VS=very strong (greater than 70). Ion exchange of the cation M with other cations reveals substantially the same pattern with some minor shifts in interplanar spacing and variation in relative intensity. Other minor variations can occur depending on the metal (W) to silicon ratio of the particular sample and on whether it had been subjected to thermal treatment.

The borosilicates of the invention can be suitably prepared e.g., in an autoclave, by preparing a reaction mixture which is substantially free of aluminum ions, less than about 100 wppm, based on the weight of silica in the reaction mixture, and which contains tetrapropyl ammonium ion, e.g., from the bromide or hydroxide, sodium hydroxide, a boron compound, an oxide of silicon, a chelating agent, e.g., EDTA, and water and having a composition, in terms of mole ratios falling within the following ranges:

| | Broad | Preferred |
|---|---|---|
| $OH^-/SiO_2$ | .05-3 | 0.20-0.90 |
| $R_4N^+/(R_4N^+ + Na^+)$ | 0.1-1 | 0.20-0.8 |
| $H_2O/OH^-$ | 10-500 | 60-120 |
| $SiO_2/W_2O_3$ | 5-500 | 12-50 |
| $SiO_2/EDTA$ | 1-1000 | 20-100 | wherein R is propyl and W is boron and maintaining the mixture until crystals of the borosilicate are formed. It is noted that an excess of tetrapropylammonium hydroxide can be used which would raise the value of $OH^-/SiO_2$ above the ranges set forth above. The excess hydroxide, of course, does not participate in the reaction. Alternate methods of preparation, such as by refluxing with sodium chloride and sulfuric acid as shown hereinbelow in Example 2, may result in the $OH^-/SiO_2$ and $R_4N^+/(R_4N^+ + Na^+)$ ratios falling outside the above ranges. Thereafter the crystals are separated from the liquid and recovered. Typical reaction conditions consist of heating the foregoing reaction mixture at an elevated temperature, e.g., about 50° to 250° C., or higher, for a period of time of from about six hours to 60 days. A preferred temperature range is from about 100° C. to 190° C., with the amount of time at a temperature in such range being from about 1 to 16 days. Reflux, an autoclave or other reaction method may be employed.

The digestion of the gel particles is carried out until crystals form. The solid product is separated from the reaction medium, as by cooling the whole to room temperature, filtering, and water washing.

The foregoing product is dried, e.g., at 110° C. for from about 8 to 24 hours or longer. Of course, milder conditions may be employed if desired, e.g., room temperature under vacuum.

An important feature of the invention is a process for activating the novel crystalline compositions of the invention for enhanced use in various conversion processes. In general, the activation procedure comprises:

(a) Heat treating the dried silicate composition at e.g., about 200°-900° C., preferably about 400°-600° C. for about 1 to 60 hours, preferably 10-20 hours;

(b) Treating the heated silicate with a reducing agent for about 1 to 80 hours, preferably 2 to 48 hours at about 200°-900° C., preferably 400° to 600° C.; and (c) Heat treating the reduced silicate using the procedure of step (a).

In a preferred embodiment, the activation procedure comprises:

(1) Heat treating the dried silicate composition at e.g., about 200°–900° C., preferably about 400° to 600° C. for about 1 to 60 hours, preferably 10 to 20 hours;

(2) Ion exchanging the heat treated silicate with a material which upon further heat treating decomposes to provide silicate having a hydrogen cation;

(3) Washing and drying the exchanged silicate;

(4) Heat treating the dried silicate using the procedure of step (1);

(5) Treating the heated silicate with a reducing agent for about 1 to about 80 hours, preferably 2 to 48 hours at about 200°–900° C., preferably 400° to 600° C.; and (6) Heat treating the reduced silicate using the procedure of step (1).

It will be appreciated by those skilled in the art that steps (1)–(4), inclusive of the preferred embodiment, and step (a), above, are well-known and represent a method commonly used to activate zeolite type catalysts. The composition of the invention may also be suitably employed in the form obtained after step 4 or after step a. Steps b and c and 5 and 6 represent the method of further activating the composition and is hereinafter termed "Redox Treatment". Heat treating may be done in any atmosphere as is known in the art and is preferably done in air.

DESCRIPTION OF THE PREFERRED EMBODIMENTS

As noted hereinabove, and as known in the art, the procedure for preparing zeolites, e.g., aluminosilicates, is well-known. It is an essential feature of the present invention however, that the crystalline composition be prepared using a reaction mixture containing, based on weight percent silica, less than about 100 wppm aluminum ions, preferably less than about 50 wppm and a chelating agent, such as ethylene diamine tetraacetic acid (EDTA), nitriliotriacetic acid (NTA) and 8-hydroxyquinoline in an amount of about 0.005 to 5 parts chelating agent, preferably 0.05 to 0.25 parts. Aside from other difference with prior art crystalline silica compositions, the borosilicate compositions formed herein are substantially free of aluminum with the molar ratio of $SiO_2/Al_2O_3$ being greater than about 8,000, and even 30,000. The following chelating agents used to prepare borosilicates provided compositions which could not be activated using the Redox Treatment of the invention; pyridine-2-carboxylic acid, 8-hydroxyquinoline-5-sulfonic acid and sodium glucoheptonate (Seglene 540).

It is not known why the crystalline compositions of this invention provide such unexpected properties as high dimethyl ether reactivity with concomitant aliphatic hydrocarbon selectively, and lack of conversion of ethylene and methanol. As will be shown hereinbelow, crystalline compositions not preparing using both a low aluminum level and chelating agent do not have these properties and, cannot be Redox Treated to provide a crystalline composition having enhanced catalytic hydrocarbon or oxygenated compound conversion properties, among others. It is possible to theorize that at low aluminum levels the chelate becomes entrapped as the [-O-Si-O-B-O-] chains crystallize to form the three dimensional crystal network. Subsequent thermal treatment may create cavities which have an internal surface modified by the chelate.

In preparing the crystalline compositions of the invention it is important that substantially aluminum-free raw materials be employed. The substantially aluminum free silica source can be any of those commonly considered for use in synthesizing zeolites such as powdered solid silica, silicic acid, colloidal silica or dissolved silica. A preferred silica source is Cab-O-Sil, sold by Cabot Co.

The substantially aluminum free metallic oxide material may be selected from the group consisting of Group III A, Group V B and Group VI B. A preferred metal is boron and the source may be boric oxide, boric acid, sodium borate, among others.

The specific crystalline compositions described, when prepared in the presence of organic cations, are inactive, possibly because the intercrystalline free space is occupied by organic cations from the forming solution. They may, however, be activated by heat treatment using known techniques such as heating in an inert atmosphere or air at 200°–900° C., for 1 to 60 hours. This may be followed by ion exchange with ammonium salts and further heat treatment at 200°–900° C. if desired.

The crystalline compositions can be used either in the alkali metal form, e.g., the sodium form, the ammonium form, the hydrogen form, or other univalent or multivalent cationic form. Preferably, either the ammonium or hydrogen form is employed. They can also be used in intimate combination with hydrogenating components such as tungsten, vanadium, copper, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to the present catalyst such as, for example, in the case of platinum, by treating the crystalline composition with a platinum metal-containing ion. Thus, suitable platinum compounds include chloroplatinic acid, platinous chloride and various compounds containing the platinum amine complexes.

A particularly desirable ionic form is obtained when a metal from the Lanthanide series is employed. Lanthanum is preferred because of its demonstrated effectiveness. As shown hereinbelow, the USI-10B composition ion exchanged with lanthanum and Redox Treated provides a marked selectivity to C4—aliphatics (93 wt. %) as compared to C5+ aliphatics (7 wt. %) and no aromatics when dimethyl ether is passed over the composition under reaction conditions. A hydrogen ion form, however, for example, produces about 50% C4—and 50% C5+ under similar conditions.

The catalyst, when emloyed either as an adsorbent or as a catalyst in one of the aforementioned processes, may be heat treated as described hereinabove.

Members of the present family of crystalline compositions can have the original cations associated therewith replaced by a wide variety of other cations according to techniques well-known in the art. Typical replacing cations would include hydrogen, ammonium and metal cations including mixtures of the same. Of the replacing metallic cations, particular preference is given to cations of metals such as rare earth metals, manganese and calcium as well as metals of Group II of the Periodic Table, e.g., zinc and Group VIII of the Periodic Table, e.g., nickel.

Typical ion exchange techniques include contacting the members of the family of borosilicates with a salt solution of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249, 3,140,251 and 3,140,253, which are incorporated herein by reference.

Following contact with the salt solution of the desired replacing cation, the crystalline compositions are then preferably washed with water and dried at a temperature ranging from 65° C. to about 315° C. and thereafter heat treated as previously described.

Regardless of the cations replacing the sodium in the synthesized form of the catalyst, the spatial arrangement of the atoms which form the basic crystal lattices in any given composition of this invention remain essentially unchanged by the described replacement of sodium or other alkali metal as determined by taking an X-ray powder diffraction pattern of the ion-exchanged material. For example, the X-ray diffraction pattern of several ion-exchanged compositions reveal a pattern substantially the same as that set forth in Table 1.

The compositions prepared by the instant invention are formed in a wide variety of particular sizes. Generally speaking, the particles can be in the form of a powder, a granule, or a molded product, such as extrudate having a particle size sufficient to pass through a 2 mesh (Tyler) screen and be retained on a 100 mesh (Tyler) screen. In cases where the catalyst is molded, such as by extrusion, the composition can be extruded before drying or dried or partially dried and then extruded.

In the case of many catalysts, it is desired to incorporate the composition of this invention with another material resistant to the temperatures and other conditions employed in organic conversion processes. Such materials include active and inactive materials and synthetic or naturally occurring crystalline compositions as well as inorganic materials such as clays, silica and/or metal oxides. The latter may be either naturally occurring or in the form of gelatinous precipitates or gels including mixtures of silica and metal oxides. Use of a material in conjunction with the present catalyst tends to improve the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc. function as binders for the catalyst. It is desirable to provide a catalyst having good crush strength, because in a chemical process the catalyst is often subjected to handling or use which tends to break the catalyst down into powder-like materials which cause problems in processing. These clay binders have been employed for the purpose of improving the crush strength of the catalyst.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel.

It is an important feature of the invention that the activated catalyst be further activated (Redox Treatment) to provide a composition having different and/or enhanced catalytic properties, especially for the selective conversion of hydrocarbons or oxygenated compounds to certain useful products. It has been found that an activated catalyst containing preferably a hydrogen cation may be so activated by treating the activated catalyst with a reducing agent for about 1 to 80 hours at about 200° to 900° C. A preferred treatment is about 2 to 48 hours at about 400° to 600° C. Any reducing agent may be used or a compound which under the treatment conditions form a reducing agent, such as dimethyether. Dimethylether and hydrogen are preferred because of their demonstrated effectiveness. Following the reduction stage, the composition is then heat treated, e.g., heated at about 200°–900° C., preferably 400° to 600° C. for about 1 to 60 hours.

The following examples are presented as specific embodiments of the present invention and show some of the unique characteristics of the claimed crystalline compositions and are not to be considered as constituting a limitation on the present invention.

EXAMPLE 1

This example shows the necessity for preparing a USI-10B composition using the method of the invention and the enhanced hydrocarbon conversion thereof when activated using the activation procedure (Redox Treatment) of the invention and compares it with crystalline borosilicates prepared using a different method.

PREPARATION OF SAMPLE A 16 grams (g) of Cab-O-Sil, Grade MS-7, 6.3 g NaOH and 1.7 g ethylenediaminetetraacetic acid (EDTA) were mixed in boiling water. A second aqueous mixture was prepared containing 1.01 g boric acid and 37.6 g tetrapropylammonium bromide (TPA-Br) in water at room temperature. While still hot, the second mixture was added to the first mixture. The total weight is about 300 g. The combined mixture was placed in a teflon container and heated in a sealed autoclave maintained at about 185° C. for 3½ days. After cooling, the mixture was filtered using a small amount of Jaguar C-13 (Celanese) as a filtering and settling aid, and the recovered crystalline material was washed with copious quantities of deionized water and dried at 120° C. for about 10 hours in an air oven. The yield was approximately 16.2 g and the dried material was identified by X-ray diffraction as a crystalline material having the typical USI-10B pattern shown in Table 1.

About 11.5 g of the dried borosilicate was heated in air at about 538° C. for 16 hours. After cooling, it was refluxed with a solution of 27 g NH$_4$Cl in 110 ml. (milliliters) water for 4½ hours. The mixture was then filtered and the borosilicate washed with copious quantities of deionized water. The ion exchange was repeated using a solution of 20 g NH$_4$Cl in 105 ml. water and refluxed for 18 hours. The ammonium exchanged material was collected and washed on a filter with copious quantities of deionized water using a small amount of Jaguar C-13 and dried at 120° C.–125° C. for 20 hours. To test the material for activity, 5 g of the dried material was loaded into a quartz reactor (1.5 centimeters (cm)×25 cm) and heated to about 500° C. under flowing air for about 20 hours. The air was then discontinued and the specified reactant, to wit, dimethyl ether (DME) fed into the reactor at a weight hourly space velocity (WHSV) of about 1.5. The pressure was essentially atmospheric with about a 4-6 pounds per square inch gauge (psig) backpressure.

PREPARATION OF SAMPLE 1

Sample 1 was prepared using essentially the same procedure as for Sample A except that no EDTA was used and the digestion period in the autoclave was about 9 days at 165° C.

PREPARATION OF SAMPLES 2 and 3

Samples 2 and 3 were prepared using essentially the same procedure as for Sample A except that Ludox AS-40 (DuPont) was used as the silica source and no EDTA was used for Sample 2. Sample 2 was digested for about 7 days at 168° C. and Sample 3 for about 10 days at 166° C.

Samples A and 1-3 after drying all had similar X-ray diffraction patterns as shown in Table 1. The following data are summarized hereinbelow in Table 2.

TABLE 2

| | SAMPLE NO. | | | |
|---|---|---|---|---|
| | A | 1 | 2 | 3 |
| EDTA | Yes | No | No | Yes |
| Al (wppm)* | 67 | 67 | 306 | 434 |
| $SiO_2/Al_2O_3$ (molar)* | 13,200 | 13,200 | 2,890 | 2,031 |
| $SiO_2/B_2O_3$ (molar)* | 155 | 169 | 141 | 117 |
| DME | | | | |
| % Conversion | 37 (83) | 0 (0) | 100 | 100 |
| Product Dist. (wt. %) | | | | |
| $CH_3OH$ | 10 (9) | — | 2 | 0 |
| $H_2O$ | 28 (37) | — | 37 | 33 |
| Hydrocarbon | 62 (54) | — | 61 | 66 |
| Wt. % Hydrocarbon Selectivity | | | | |
| $C_4-$ Aliphatics | 52 (50) | — | 32 | 28 |
| $C_5+$ Aliphatics | 47 (49) | — | 57 | 64 |
| Aromatics | 0 (1) | — | 11 | 8 |

() = Values obtained after "Redox Treatment" of heating with DME at about 500° C., for 2-3 hours, followed by heating in air at 500° C. for at least 18 hours.
*Calculated on dried catalyst before ion exchange.

The results shown in Table 2 clearly demonstrate the invention. Thus, a comparison of Sample A and Sample 1 shows that at low levels of aluminum, EDTA is needed in the reaction mixture since, without EDTA, no conversion of DME is obtained and the conversion is not increased by employing the Redox Treatment noted herein.

Samples 2 and 3 show the high reactivity for the conversion of DME to relatively high levels of aromatics, usually associated with a high aluminum content. Similarly, Sample 3 reacted with ethylene at a 64% conversion at 420° C. to produce a mixture of 40% $C_4$—aliphatics, 57% $C_5+$ aliphatics and 3% aromatics whereas Sample A after Redox Treatment did not react with ethylene.

EXAMPLE 2

This example demonstrates the preparation of a USI-10B material using a reflux digestion procedure at two different levels of chelating agent and activation thereof by the "Redox Treatment".

PREPARATION OF SAMPLE B 74.3 g silica (Cab-O-Sil, Grade M-5), 25.9 g. NaOH and 0.701 g. EDTA were dissolved in boiling water and cooled to 25° C. Total solution volume was 800 ml. A second solution (total volume of 400 ml) was prepared by dissolving 34.7 g TPA-Br, 8.7 g boric acid, 87.1 g NaCl and 22.3 g concentrated $H_2SO_4$ in water and cooling to 25° C. The second solution was slowly added to the silica solution with stirring. During the addition, the solution formed a gel which broke up as more solution and additional water (about 200 ml) were added. After the addition was complete, the mixture was rapidly mixed for about 1 hour in a 2000 ml polypropylene flask. The pH was about 8.9. A condenser was attached to the flask and was placed in an oil bath at 111° C. for 6¾ days. After removing from the oil bath and cooling the pH was about 10.6. The sample was washed with copious quantities of deionized water, collected on a filter and dried at 120° C. for about 45 hours. The sample weight was 71.7 g. The sample was then heated and ion exchanged as described in Example 1. After ion exchange, the sample was heated in air at about 500° C. for 18 hours. After cooling, 5 g of the material was loaded into a quartz reactor (1.5 cm × 25 cm) and DME passed through the reactor at a temperature of about 420° and a WHSV of about 1.5.

PREPARATION OF SAMPLE C

The same procedure as for Sample B was used except that 80 g silica, 27.7 g NaOH, 8.8 g EDTA, 33.6 g TPA-Br, 8.9 g boric acid, 85.3 g $N_aCl$ and 19 g $H_2SO_4$ was used. The volume of the silica solution was about 900 ml and the TPA-Br solution about 500 ml. The initial pH was 8.5, the final pH about 10.4 and the digestion period was 11½ days.

The following data are summarized hereinbelow in Table 3.

TABLE 3

| | Sample No. | | | |
|---|---|---|---|---|
| | B | B* | C | C* |
| Al (wppm)** | 33 | | 33 | |
| $SiO_2/Al_2O_3$ (molar)** | 23,500 | | 23,500 | |
| $SiO_2/B_2O_3$ (molar)** | 54 | | 60 | |
| DME | | | | |
| % Conversion | 20 | 54 | 42 | 71 |
| Product Dist. (Wt. %) | | | | |
| $CH_3OH$ | 63 | 33 | 7 | 8 |
| $H_2O$ | 9 | 16 | 31 | 37 |
| Hydrocarbon | 28 | 51 | 62 | 55 |
| Wt. % Hydrocarbon Selectivity | | | | |
| $C_4-$ aliphatics | 95 | 40 | 49 | 59 |
| $C_5+$ aliphatics | 5 | 56 | 51 | 40 |
| Aromatic | 0 | 4 | 0 | 1 |

*Redox Treated by heating with DME at about 500° C. for about 3 hours, followed by heating in air at 500° C. for at least 18 hrs.
**Calculated on dried catalyst before ion exchange.

EXAMPLE 3

ORGANIC ADSORPTION PROPERTIES

The organic adsorption properties of USI-10B were compared with a borosilicate material, both before and after Redox Treatment, by adding 0.5 g of each adsorbent and 5 ml of the aqueous organic solution (1% by volume for methanol, n-butanol and methyl cellosolve and 0.1% for phenol) to glass vials stoppered with rubber, teflon coated serum caps. Vials containing only the aqueous organic solution served as a blank. All the vials were attached to a motor driven wheel, agitated for 2 hours and equilibrated for at least 10 hours before analysis. The results were statistically analyzed.

PREPARATION OF SAMPLE D and D*

This sample is the same as Sample C, supra, and is the form after ion exchange and heating in air as described therein. Sample D* was prepared by heating Sample D in a quartz tube in air to 500° C., purging with nitrogen and then Redox Treating by heating with hydrogen for 21 hours at 500° C., cooling and followed by heating in air for 16 hours at about 538° C.

PREPARATION OF SAMPLE 4 AND 4*

Sample 4 was prepared using the procedure described to prepare Sample 1 with the following amounts being employed: 16 g of Cab-O-Sil and 12.5 g (50% NaOH solution) were dissolved in 100 ml water by boiling. 1.01 g boric acid, 37.6 g TPA-Br were dissolved in 100 ml water at room temperature. The solutions were combined and heated in a sealed autoclave for 9½ days at 170° C. The yield after drying for about 18 hours at 110° C. was about 12 g.

About 10 g of the dried borosilicate was heated in air at about 532° C. for 16 hours, ion exchanged at reflux for 4 hours with a solution of 17.4 g $NH_4Cl$ in 100 ml $H_2O$, washed, ion exchanged for 16 hours with fresh $NH_4Cl$ solution, washed, filtered and dried. 8.2 g of the dried material was heated in air for 16 hours at about 500° C.

Sample 4* was prepared by treating Sample 4 as described for Sample D* above.

TABLE 4

| | Sample No. | |
|---|---|---|
| | D and D* | 4 and 4* |
| Al (wppm)** | 33 | 13 |
| $SiO_2/Al_2O_3$ (molar)** | 23,500 | 60,000 |
| $SiO_2/B_2O_3$ (molar)** | 60 | 155 |

**Calculated on dried catalyst before ion exchange.

TABLE 5

| | % ORGANIC REMOVED | | | |
|---|---|---|---|---|
| Sample | Methanol | n-Butanol | Methyl Cellosolve | Phenol |
| D | 25.2 ± 1.5 | 98.7 ± 0.4 | 68.2 ± 0.5 | 95.8 ± 0.5 |
| D* | 20.9 ± 0.9 | 95.3 ± 0.5 | 74.5 ± 0.7 | 91.7 ± 0.5 |
| 4 | 13.8 ± 1.8 | 98.8 ± 0.2 | 71.6 ± 0.9 | 95.7 ± 0.6 |
| 4* | 16.3 ± 1.4 | 99.1 ± 0.1 | 71.7 ± 0.5 | 95.8 ± 0.3 |

The data in Table 5 clearly show the different adsorption properties between the borosilicates of the invention (D and D*) versus borosilicates not of the invention (4 and 4*). Further, the effect of the Redox Treatment significantly alters the adsorption properties of the borosilicates of the invention D and D* while not statistically altering the borosilicates 4 and 4*.

EXAMPLE 4

NITROGEN ISOTHERM PROPERTIES

Figure 1:
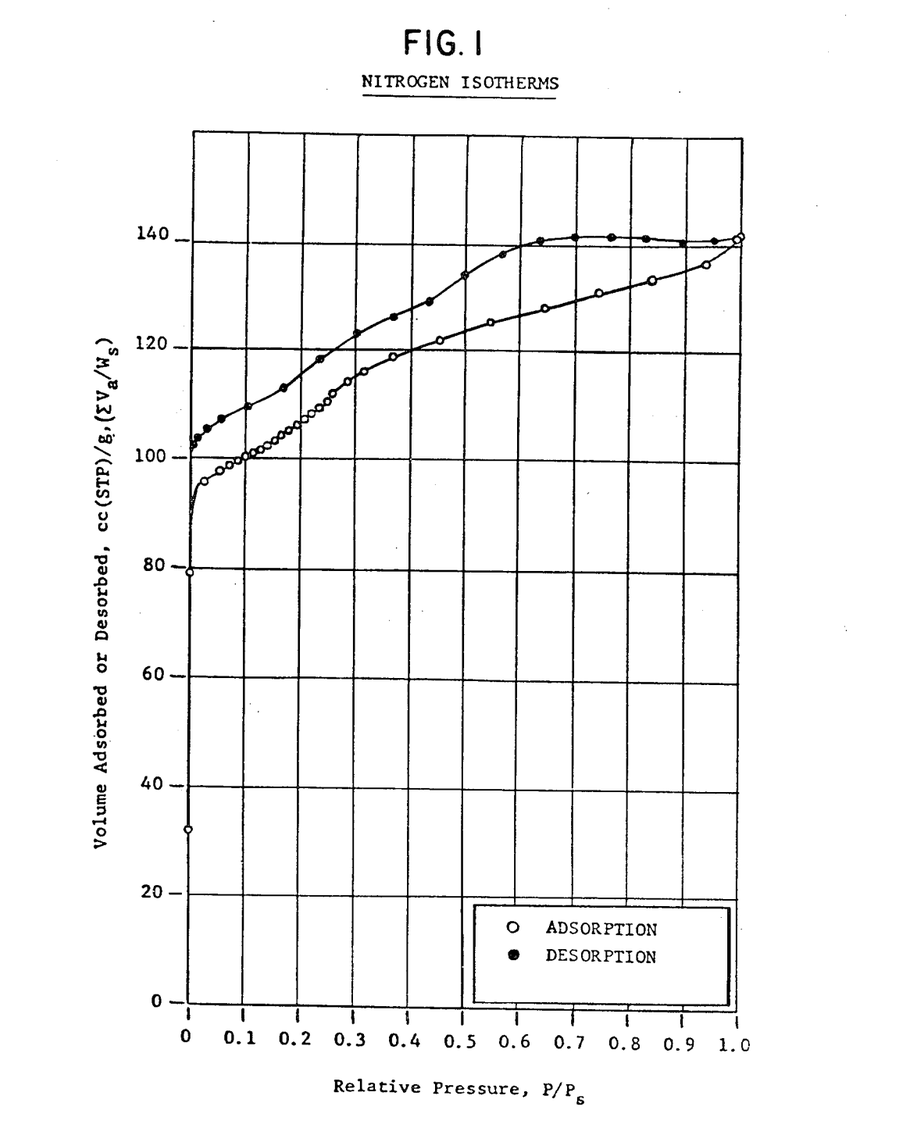
Figure 2:
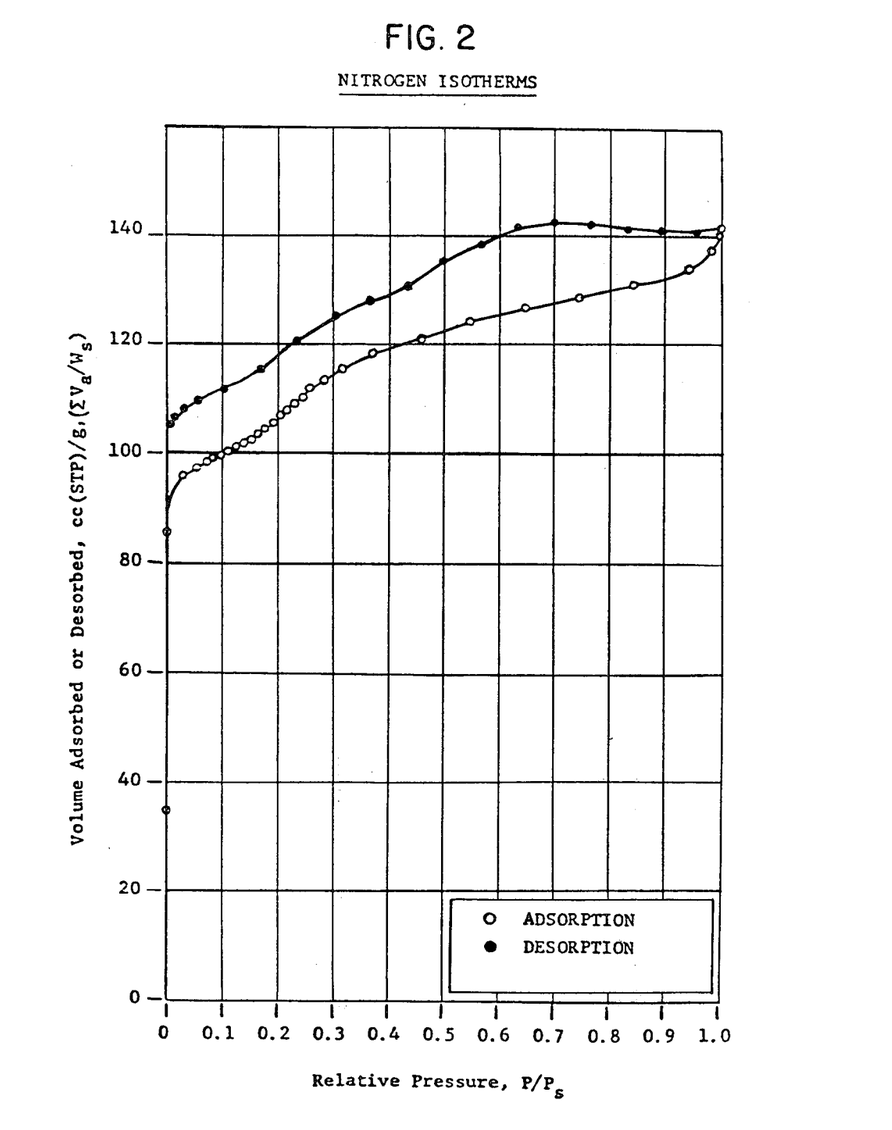
Figure 3:
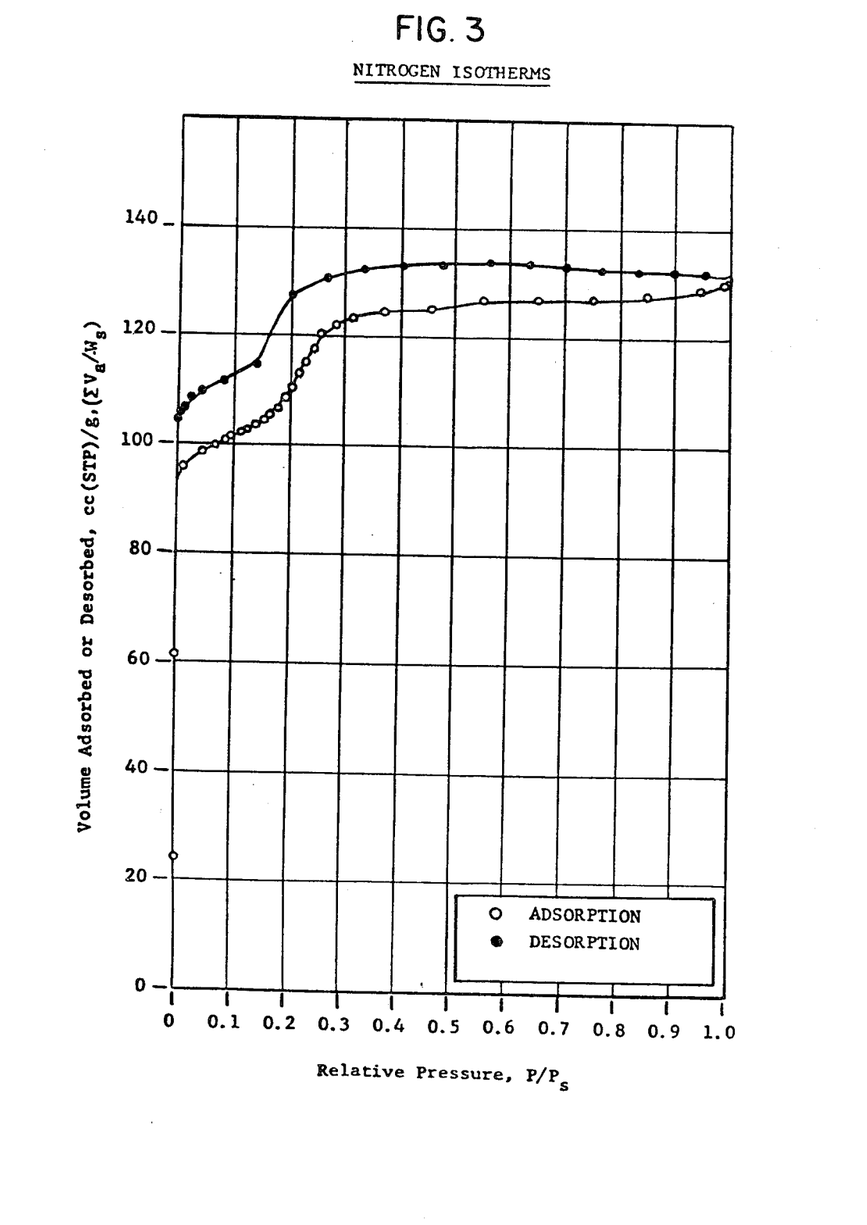
Figure 4:
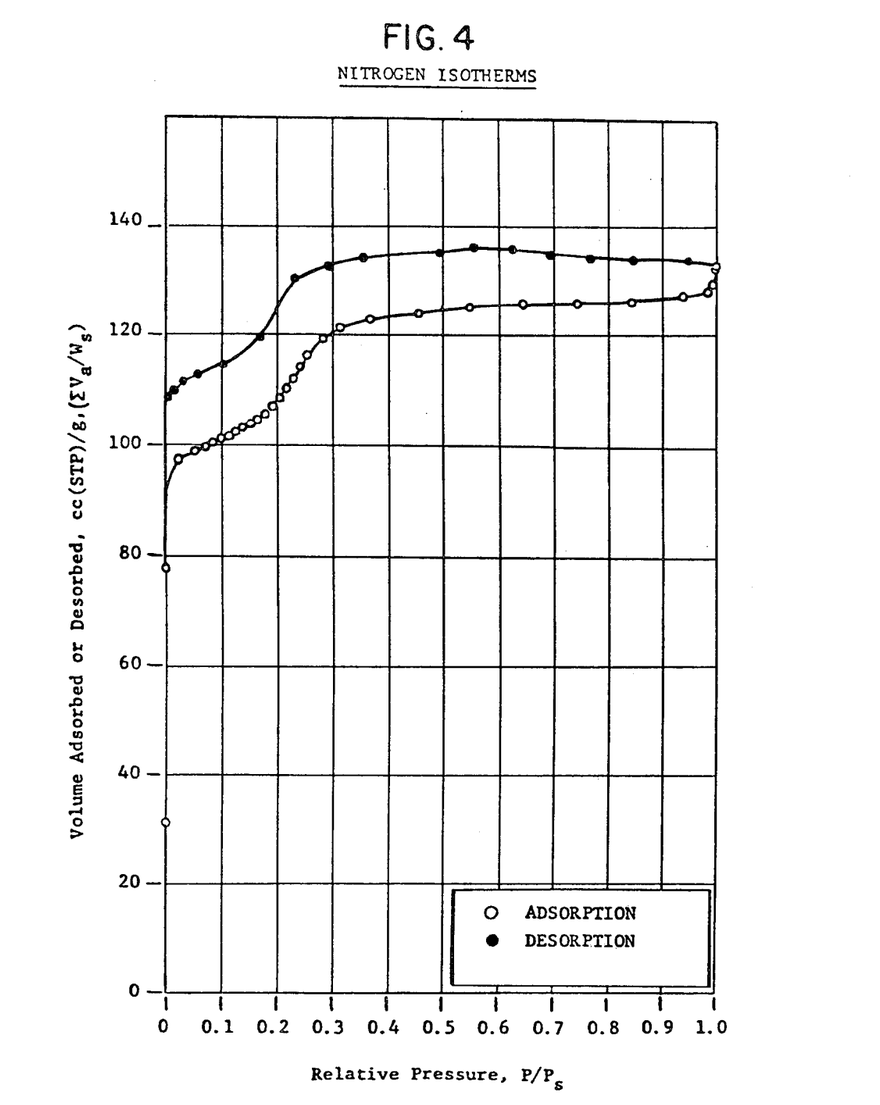

The nitrogen isotherm properties of Samples 4 and 4* of Example 3 and E and E* were obtained using a Micromeritics 2100D Orr Surface-Area Pore Volume Analyzer. E and E*, of the invention, were prepared using a method similar to that for Sample C of Example 2 except that the Redox Treatment is the same as described in Example 3. E and E* contain 22 wppm aluminum, have a $SiO_2/Al_2O_3$ molar ratio of 35,000 and a $SiO_2/B_2O_3$ molar ratio of 55. The sample size was approximately 0.1 g and all samples were degassed at 260° C. for 2 hours under a vacuum of $10^{-4}$ mm (millimeters) Hg. The isotherms were determined at liquid nitrogen temperatures using the method shown in the Journal of American Chemical Society, Brunaner, S. and Emmett, P. H., Vol. 59 (1937), page 310, said article being incorporated herein by reference. Measurements were made from an equilibrium pressure of about 0.002 mm Hg to saturation pressure and equilibrium was established if the equilibrium pressure remained constant for at least 30 seconds. Isotherm data were calculated using the equation shown in the Journal of Applied Chemical Society, Brunaner, S., Emmett, P. H. and Teller, E., Vol. 60 (1938), page 309 and Vol. 62 (1940), page 1723, both articles being incorporated herein by reference. The results are shown in FIGS. 1–4 and show that significant differences exist between the materials prepared by the method of the invention using EDTA (FIG. 1—Sample E and FIG. 2—Sample E*) versus materials not prepared according to the invention (FIG. 3—Sample 4 and FIG. 4—Sample 4*).

EXAMPLE 5

This example demonstrates the need for employing a chelating agent in the digestion reaction mixture.

Crystalline borosilicates (USI-10B) prepared in a similar manner to the procedure described in Example 1 were comparatively tested after Redox Treatment for conversion of DME at 420° C. and 1.5 WHSV. Sample 5 was prepared without EDTA in the reaction mixture and Sample 6 was prepared by extracting Sample 5 (which was in the $NH_4^+$ form) with EDTA in an amount essentially equivalent to that employed to prepare Sample E, which was prepared by employing EDTA in the reaction mixture. The results are as follows:

TABLE 6

| | SAMPLE | | |
|---|---|---|---|
| | E* | 5 | 6 |
| % Conversion | 97 | 0 | 2 |
| Product Dist. | | | |
| $CH_3OH$ | 20 | — | — |
| $H_2O$ | 26 | — | — |
| Hydrocarbon | 54 | — | — |
| Hydrocarbon Distribution (Wt. %) | | | |
| $C_4-$ | 41 | — | 29 |
| $C_5+$ | 56 | — | 71 |
| Aromatics | 3 | — | 0 |

EXAMPLE 6

This example demonstrates the use of a USI-10B material which was ion exchanged with lanthanum and Redox Treated.

About 5.6 g of the USI-10B material prepared in Example 2, Sample No. C (and in the $NH_4^{30}$ ion form) was ion exchanged with 9.8 g $LaCl_3.6H_2O$ in 50 ml. water by refluxing for 2½ hours. The exchanged material was washed by decantation three times using deionized water, collected on a filter and dried for 20 minutes at 130° C. in an air oven. 5.4 g was recovered and 5.0 g charged into a reactor 1.5 cm×25 cm and heated in flowing air at 500° C. overnight. DME at 1.5 WHSV and 420° C. was then passed through the reactor and 7% was coverted to methanol. After Redox Treatment using DME at 500° C. for 2 hours, followed by heating in air at 500° C. for 18 hours, DME was again passed through the reactor at 420° C. and a 20% conversion resulted with, by weight %, 43% $CH_3OH$, 14% $H_2O$ and 43% hydrocarbons being formed. The selectivity to hydrocarbons showed 93% $C_4$-aliphatics, 7% $C_5+$ aliphatics and no aromatics.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A crystalline metal silicate which is substantially free of aluminum having a composition in terms of mole ratios as follows:

$0.8 \pm 0.4 M_{2/n}O:W_2O_3:5$ to $500$ $SiO_2:0$ to $100$ $H_2O$ where M is a cation, n is the valence of said cation and $W_2O_3$ is a metal oxide, said metal silicate having the X-ray diffraction pattern set forth in Table 1 of the specification prepared by the method which comprises preparing a reaction mixture which is substantially free of aluminum ions and which contains tetraalkylammonium compound, sodium hydroxide, an oxide of the desired metal, an oxide of silicon, water and an aluminum chelating agent effective to provide a catalytically active crystalline metal silicate, maintaining the mixture at an elevated temperature until crystals said metal silicate are formed and separating and recovering said crystals, and in terms of mole ratios falling within the following ranges, the reaction mixture contains:

| | |
|---|---|
| $OH^-/SiO_2$ | .05–3 |
| $R_4N^+/(R_4N^+ + Na^+)$ | 0.1–1 |
| $H_2O/OH^-$ | 10–500 |
| $SiO_2/W_2O_3$ | 5–500 |
| $SiO_2$/Chelating agent | 1–1000 | wherein R is propyl.

2. A crystalline metal silicate according to claim 1 wherein the metal is boron and the aluminum content is an amount of less than about 100 wppm based on the weight of silica in the reaction mixture.

3. A crystalline metal silicate according to claim 2 wherein the chelating agent is selected from the group consisting of ethylene diamine tetraacetic acid, nitriliotriacetic acid and 8-hydroxyquinoline.

4. A crystalline metal silicate according to claim 3 wherein the chelating agent is ethylene diamine tetraacetic acid.

5. An activated crystalline metal silicate prepared by an activation method which comprises:
   (1) heat treating the dried silicate composition of, claim 1 at about 200° to 900° C.;
   (2) treating the heated silicate with a reducing agent for about 1 to 80 hours at about 200° to 900° C.; and
   (3) heat treating the reduced silicate following the procedure of step (1),
   said activated crystalline metal silicate having a nitrogen isotherm adsorption capacity as shown in FIG. 2.

6. An activated crystalline metal silicate according to claim 5 wherein the silicate heat treated in step (1) is in the hydrogen ion form.